United States Patent [19]

Winters

[11] Patent Number: 4,917,942
[45] Date of Patent: Apr. 17, 1990

[54] NONWOVEN FILTER MATERIAL

[75] Inventor: John C. Winters, St. Paul, Minn.

[73] Assignee: Minnesota Mining and Manufacturing Company, St. Paul, Minn.

[21] Appl. No.: 288,294

[22] Filed: Dec. 22, 1988

[51] Int. Cl.[4] ............................................. B32B 27/00
[52] U.S. Cl. ..................................... 428/286; 55/155;
55/486; 55/DIG. 39; 428/284; 428/296;
428/297; 428/298; 428/903
[58] Field of Search ............... 428/284, 286, 297, 298,
428/903, 296; 55/155, 486, 487, 528, 131, DIG. 39

[56] References Cited

U.S. PATENT DOCUMENTS

| | | | |
|---|---|---|---|
| 4,011,067 | 3/1977 | Carey | 55/354 |
| 4,041,203 | 9/1977 | Brock et al. | 428/157 |
| 4,116,648 | 9/1978 | Busch | 55/380 |
| 4,164,400 | 8/1979 | Wald | 55/382 |
| 4,215,682 | 8/1980 | Kubik et al. | 55/DIG. 39 |
| 4,257,791 | 3/1981 | Wald | 55/382 |
| 4,375,718 | 3/1983 | Wadsworth et al. | 55/155 |
| 4,478,620 | 10/1984 | Tamura | 55/486 |
| 4,589,894 | 5/1986 | Gin et al. | 55/382 |
| 4,650,506 | 3/1987 | Barris et al. | 55/487 |

Primary Examiner—James J. Bell
Attorney, Agent, or Firm—Donald M. Sell; Terryl K. Qualey; David W. Anderson

[57] ABSTRACT

Improved microfibrous filtration laminate comprising a highly permeable layer of a self-supporting nonwoven fabric which provided support for a layer of a randomly intertangled nonwoven mat of electret-containing microfibers of synthetic polymers are disclosed. The filtration laminate, which is particularly useful as disposable filter bags or as a lining material for disposable paper filter bags for vacuum cleaners, is characterized by thickness and handling characteristics approaching that of paper filter material typically use in disposable vacuum clean bags but having improved performance in the areas of an immediate, high particle capture efficiency, minimal flow restriction and long service life.

16 Claims, 1 Drawing Sheet

NONWOVEN FILTER MATERIAL

FIELD OF THE INVENTION

The present invention relates to nonwoven filter materials, and particularly filter materials suitable for use in disposable vacuum cleaner filters.

RELATED ART

U.S. Pat. No. 4,761,311 to J. M. Raley discloses a laminated fibrous web comprising a first fibrous layer, a second fibrous layer bonded to and of lower density than the first fibrous layer, wherein fibers in the second fibrous layer are less bonded to one another, and wherein the first and second fibrous layers are less bonded to each other than fibers in the first fibrous layer are bonded to one another. Also disclosed are a method and apparatus for making such laminated fibrous webs, by the steps of forming a first fibrous layer of a first relatively higher density, bonding fibers of the first fibrous layer to one another at a first relatively higher extent of bonding, forming a second fibrous layer at a second relatively lower density, bonding fibers in the second fibrous layer to one another at a relatively lower extent of bonding, and bonding the first and second fibrous layers to each other at a third relatively lower extent of bonding of the fibers to one another in the first fibrous layer. Apparatus is also described for carrying out such method by sequential thermal pattern bonding of the respective web layers.

U.S. Pat. No. 4,650,506 to M. A. Barris et al. discloses a multilayered microfiltration medium exhibiting high particle capture efficiency and minimal flow restriction having a base substrate layer, a fine fiber filtration or efficiency layer deposited on and adhered to the substrate layer and a nonhandleable, non-self-supporting protective cover layer and has a very smooth outer surface. Suitable cover layer materials include polystyrene and polycarbonate fibers.

U.S. Pat. No. 4,589,894 to V. M. Gin et al. discloses a vacuum cleaner disposable filter, preferably in the form of a closed container having an inlet for connection to the air discharge outlet of the vacuum cleaner, which comprises an assembly of layers including an inner filter layer provided by a nonwoven microfiber web formed of randomly entangled synthetic polymeric microfibers and highly porous outer support layers each preferably comprising spun bond nonwoven webs on either side of the inner layer.

U.S. Pat. No. 4,478,620 to T. Tamura discloses an air filter which is made of a nonwoven fabric and an overlaid synthetic net which are intermittently point bonded together. The net has raised bumps which form the bonding points for the fabric. A filter of this design is structurally strong but does not generate a large pressure loss.

U.S. Pat. No. 4,257,791 to S. A. Wald discloses a filter wherein the filtering means has a nonwoven needled textile filter fabric with an overall bulk density of at least six pounds per cubic foot and bulk density gradient such that the bulk density at the face surface of the fabric is greater than the bulk density at the back surface of the fabric. In conjunction with that bulk density gradient is a filtering gradient such that the fineness of filtration at the back face surface is greater than the fineness of filtration at the surface. The filter may be in any convenient form, such as the bag of an air conveyer filter or a vacuum cleaner filter.

U.S. Pat. No. 4,164,400 to S. A. Wald discloses a filter wherein the filtering means has a nonwoven needled textile filter fabric with an overall bulk density of at least 6 pounds per cubic foot and a bulk density gradient such that the bulk density at the face surface of the fabric is greater than the bulk density at the back surface of the fabric. In conjunction with that bulk density gradient is a filtering gradient such that the fineness of filtration at the face surface is greater than the fineness of filtration at the back surface. The filter may be in any convenient form, such as the bag of an air conveyer filter or a vacuum cleaner filter.

U.S. Pat. No. 4,116,648 to C. B. Busch discloses a vacuum cleaner dust bag that is constructed to substantially increase the filtering action of the bag. The filter dust bag is constituted of two concentric sections or compartments with the space of one of the compartments having a dry filter mat material that effectively traps all dust and dirt particles down to particles of about 0.3 microns. The tube on the filter dust bag which connects to the discharge outlet of the vacuum cleaner is constructed of an air-impervious material, while the outer and inner layers of the filter are fabricated of air-previous material of different elasticity.

U.S. Pat. No. 4,041,203 to R. J. Brock et al. discloses a nonwoven fabric-like material which comprises an integrated mat of generally discontinues, thermoplastic polymeric microfibers and a web of substantially continuous and randomly deposited, molecularly oriented filaments of a thermoplastic polymer. The polymeric microfibers have an average fiber diameter of up to about 10 microns while the average fiber diameter of filaments in the continuous filament web is in excess of about 12 microns. Attachment between the microfiber mat and continuous filament web is achieved at intermittent discrete regions in a manner so as to integrate the continuous filament web into an effective load bearing constituent of the material. The material has desirable strength characteristics and posses a textile-like appearance, drape and hand. By autogenously bonding the mat and web together in a manner so as to provide substantially uniform discrete bond regions, particularly outstanding strength characteristics with respect to energy absorption, tensile strength, and tear resistance can be achieved.

U.S. Pat. No. 4,011,067 to P. H. Carey discloses a filter medium which can remove a high percentage of fine particles from a gas stream while causing a relatively low pressure drop in the gas stream, which comprises a base porous web, one or more light weight non-self-supporting layers of microfibers collected and carried on the base porous web, and a top porous web. A new aerosol filter apparatus incorporates the filter medium to provide an economical consistent filtering of air in a home, office, or industrial environment. In the new filter apparatus, a web of the filter medium extends from a supply roll across a stream of the air being cleaned to a take-up roll; and the filter medium is advanced from the supply roll to the take-up roll to gradually provide a fresh length of filter medium in the air stream. It is suggested that the microfibrous filter webs of this invention can develop charges during use which may improve the ability of the filter to attract and hold particulate materials.

Disposable vacuum cleaner filters are typically formed from paper filter media having a controlled air permeability. The paper filters are comparatively inexpensive but they are not effective in removing extremely fine dust and dirt particles. Additionally, they have a comparatively short service life due to "blinding over" with the dirt they trap.

The controlled porosity or openness of the paper filter media that allows passage of fine dust through the bag wall permits the filter to be at least partially filled with particulate dirt before the air pressure drop across the bag wall increases to an unacceptable level. Fine particle filtration performance of paper media can be improved by reducing the porosity of the media, but the consequence of this change is an increase in the air pressure drop across the media. Additionally, the reduced porosity causes dirt particles to accumulate on the paper surface at a faster rate than they do on a more porous filter, thereby causing a more rapid rate of increase in the pressure drop across the media and concurrently shortening the service life of the filter.

The use of nonwoven microfibrous mats as the filter for vacuum cleaner filters has previously been suggested as a desirable alternative to paper filter media as the microfibrous mats are capable of higher particle capture efficiencies with comparable or lower pressure drops than paper media. However, microfibrous mats having the required air permeability are typically thicker and significantly weaker than paper media and consequently have been used in conjunction with a carrier fabric, to help facilitate handling the web, and a cover web to protect the microfibrous mats from catastrophic damage due to mechanical erosion induced by the influx of airborne dirt and debris. The resulting layered constructions have been thicker than standard paper filter media and did not have the handling characteristics of the paper media so that they could be converted into vacuum cleaner filter bags with the same equipment used with the paper media.

SUMMARY OF THE INVENTION

The present invention provides for a disposable microfibrous filter laminate especially suited for a dust and debris collection device for vacuum cleaning apparatus comprising a laminate structure of a porous layer of self-supporting nonwoven fabric having an air permeability of at least 300 $m^3/min/m^2$ and a layer of a randomly intertangled nonwoven mat of electric-containing microfibers of synthetic polymer which is coextensively deposited on and adhered to the self-supporting nonwoven fabric.

The microfibrous filtration laminate of the present invention is characterized by thickness and handling characteristics approaching that of the paper filter media typically used in disposable vacuum cleaner filter bags but filtration performance superior to the paper media in the areas of an higher immediate particle capture efficiency, lower flow restriction and longer service life.

The mats of electret-containing microfibers are deposited directly on and bonded to the self-supporting nonwoven fabric without additional adhesives or web consolidation. The microfibrous filtration laminate of the present invention surprisingly demonstrates capture efficiencies at least comparable to those of microfibrous filter media which have previously been reported as being suitable for vacuum cleaner filter bag applications in spite of the fact that the filter laminate of the present invention have significantly lower basis weights and thicknesses than the prior art media.

The lower basis weight mats of electretcontaining microfibers, surprisingly, do not appear to be excessively susceptible to catastrophic damage due to mechanical erosion by incoming dirt and debris. Vacuum cleaner filter bags fabricated from the microfibrous filter laminate of the present invention have demonstrated outstanding resistance to mechanical erosion, showing no evidence of tearing or rupture under simulated use conditions.

DETAILED DESCRIPTION OF THE INVENTION

Figure 1:
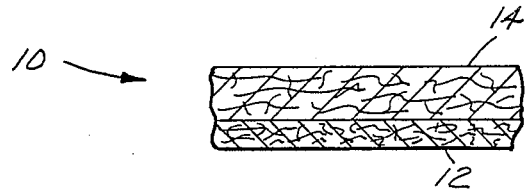
FIG. 1 is an enlarged cross-section of the microfibrous filter laminate of the present invention.

As mentioned previously, the present invention provides for an improved microfibrous filter laminate which has capture efficiencies comparable to or exceeding those demonstrated by previous microfibrous media while being significantly thinner than those same media. As illustrated in FIG. 1, the microporous filter laminate 10 of the present invention is characterized by a laminated structure of a porous layer of self-supporting nonwoven fabric 12 and a layer of a randomly intertangled nonwoven mat 14 of electret-containing microfibers of synthetic polymer 14 coextensively deposited on and adhering to the self- supporting nonwoven fabric 12.

The self-supporting nonwoven fabric 12 is selected such that it has sufficient porosity that it contributes minimally to the flow restriction of air passing through the structure, yet it possess sufficient strength and dimensional stability that it provides for the structural integrity of a fabricated filter apparatus such as a vacuum cleaner filter bag. In addition to the above mentioned properties, it is desirable that the self-supporting nonwoven fabric 12 have a thickness and handling characteristics similar to that of paper filter media that are typically used in the fabrication of disposable vacuum cleaner filter bags.

Although the present invention is particularly useful as a vacuum cleaner bag, and reference will be made throughout in terms of that application, it should be recognized that the laminate 10 has more general utility. As an example, the low basis weight and high air permeability of the laminate 10 may make the material a good candidate for use as a filter in respirators.

Preferably the self-supporting nonwoven fabric 12 comprises a consolidated web of substantially continuous and randomly deposited molecularly oriented filaments of a thermoplastic polymer such as those produced in a spun bond process. The average diameter of the fibers in the self-supporting nonwoven web 14 range from about 20 to about 30 microns. The basis weight of the self-supporting nonwoven web 14 can range from 10 to about 70 $gm./m^2$ but preferably falls in the range of from 15 to about 25 $gm./m^2$. The web 14 can be consolidated by a number of techniques including calendering or point bonding to produce a self-supporting nonwoven fabric 12 having a grab tensile strength of at least 1 kg as determined according to ASTM test method D1682. More preferably the self-supporting nonwoven fabric 12 has a grab tensile strength of at least 2.5 kg.

The self-supporting nonwoven fabric 12 must be highly porous such that it contributes minimally to the flow restriction of the laminated filter 10. Typically, the self-supporting nonwoven fabric 12 should contribute less than about 10 percent to the flow restriction and more preferably it should contribute less than about 5 percent. These criteria are met if the self-supporting nonwoven fabric 12 has an air permeability of at least 300 m$^3$/min/m$^2$ and more preferably at least about 400 m$^3$/min/m$^2$. The preferred self-supporting nonwoven fabric 12 to use in the preparation of the microfibrous filter media 10 of the present invention is a polypropylene spun bond material available as 0.5 oz. Celestra$^R$ from James River Corporation. This self-supporting nonwoven fabric 12 has an average fiber diameter of about 25 microns, a tensile grab strength of about 3 kg, a basis weight of about 17 gm/m$^2$ and a permeability of about 400 m$^3$/min/m$^2$.

The electret containing mat 14 of electretcontaining microfibers are preferably based on melt blown microfibers (BMF) prepared from polyolefins and more preferably from polypropylene. They should have an effective fiber diameter of less than about 10 microns and more preferably an effective fiber diameter of less than about 7 microns. (For a discussion of effective fiber diameter and how it is determined, see "The Separation of Airborne Dust and Particles," Institution of Mechanical Engineers, London, Proceedings 1B, 1952.) Electret-containing microfibers meeting these criteria are conveniently prepared as described in U.S. Pat. No. 4,215,682 (Kubik et al.), which is incorporated herein by reference.

The microfibrous filter laminate 10 of the present invention are prepared by collecting the mats 14 of electret-containing microfibers directly on the self-supporting nonwoven fabric 12 rather than on a conventional collector. Mats 14 of electret-containing microfibers having basis weights of between 10 and 100 gm./m$^2$ are functional while mats 14 of electret-containing microfibers having basis weights between 25 and 40 gm./m$^2$ are preferred.

Self-supporting nonwoven fabric 12 and mats 14 of electret-containing microfibers filter laminates 10 having air permeabilities of between 5 and 50 m$^3$/min/m$^2$ are functional but laminated structures having an air permeability of between 20 and 40 m$^3$/min/m$^2$ are preferred.

Because the mats 14 of electret-containing microfibers of the microfibrous filter laminate 10 of the present invention contain persistent charges, the microfibrous filter materials of the present invention exhibit an immediate high particle capture efficiency which is maintained over the service life of the filter laminate 10. This stands in contrast to other filter materials which have lower initial capture efficiencies that improve during use. Capture efficiencies of paper filter media typically improve as the filter media loads while microfibrous filter media such as those based on polyvinyl chloride fibers described in U.S. Pat. No. 4,011,067, have been found to develop an electrostatic charge during use of the filter which is believed to assist in the attraction and holding of particulate materials (i.e. improved capture efficiency of the filter).

EXAMPLES

EXAMPLE 1

A series of nonwoven filter materials of the present invention were prepared by collecting various basis weights mats 14 of electret-containing microfibers (BMF) on a polypropylene spun bond fabric 12 (0.5 oz/yd$^2$ Celestra) using a procedure similar to that described in U.S. Pat. No. 4,215,682 except that the spun bond fabric 12 was positioned directly over the collector surface. The filtration performance of these filter laminates was then compared to that of paper filter media as represented in several commercially available disposable paper vacuum filter bags and a thicker, non-electret containing microfibrous filter using ASTM test procedure D 1899 which evaluates the ability of the filter media to capture 0.3 micron diameter Dioctyl Phthalate (DOP) particles. DOP penetration data was obtained using an Air Techniques, Inc. Model Q127 DOP Penetrometer set for a flow rate of 32 liters per minute and generating an aerosol of 0.3 micron diameter DOP particles at a mass concentration of 100 mg/m$^3$. The DOP penetration was measured by comparing the upstream and downstream aerosol concentrations using light scattering photometry and the DOP capture efficiency calculated according to the formula:

$$\% \text{ Efficiency} = (1 - \text{Pen}) \times 100$$

where "Pen" is the decimal ratio of the downstream to the upstream DOP concentrations. The results of these evaluations are summarized in Table 1.

TABLE 1

| | Filter Media Performance Screening | | | |
|---|---|---|---|---|
| Sample | Capture Eff. (%) | Pressure Drop (mm H$_2$O) | Thcks. (mm) | Perm. (m$^3$/min/m$^2$) |
| P1 | 8 | 3.80 | 0.305 | 12.2 |
| P2 | 8 | 2.43 | 0.381 | 16.5 |
| P3 | 10 | 2.60 | 0.127 | 7.6 |
| P4 | 6 | 11.50 | 0.152 | 4.6 |
| P5 | 8 | 2.62 | 0.279 | 15.5 |
| NWControl[1] | 50 | 4.40 | 1.295 | 8.5 |
| NW40[2] | 74 | 1.93 | 0.559 | 23.8 |
| NW30[3] | 67 | 1.62 | 0.483 | 25.6 |
| NW25[4] | 62 | 1.25 | 0.432 | 29.6 |
| NW20[5] | 50 | 1.08 | 0.381 | 39.6 |

[1] Microfibrous vacuum filter prepared according to U.S. Pat. No. 4,589,894, 100 gm./m$^2$
[2] Basis weight of BMF mat 40 gm./m$^2$.
[3] Basis weight of BMF mat 30 gm./m$^2$.
[4] Basis weight of BMF mat 25 gm./m$^2$.
[5] Basis weight of BMF mat 20 gm./m$^2$.

The capture efficiency data presented in Table 1 shows that the microfibrous filter laminate of the present invention (NWControl - NW20) are able to remove small particles from an air stream far more effectively than the paper filter media (P1-P5). The impact of the electrets on the capture efficiency of the BMF is also evident in comparing the capture efficiency of sample NWControl, which did not contain the electrets, and samples NW40 NW20, which did contain electrets. Comparison of the data for sample NW20 with that of sample NWControl is particularly significant in that sample NW20 achieves comparable capture efficiency with a significantly lower pressure drop and a significantly lower basis weight BMF mat of electret-containing microfibers than the NWControl sample. The data presented in Table 1 also shows that the microfibrous filter media of the present invention have significantly higher air permeabilities than any of the paper filter media as well as the BMF control.

EXAMPLE 2

Samples of the microfibrous filter laminate 10 of the present invention as well as some commercially available paper filter media were subjected to a dust challenge test according to the test procedure specified in standard DIN 44956/2. This test, which utilizes a flat filter media web and exposes the media to an AC Fine Test Dust challenge at an air velocity rate of 0.5 meters per second, is specifically designed to evaluate the performance of paper filter media used in disposable vacuum filter bags. The results of these evaluations are presented in Table 2.

TABLE 2

| | AC Fine Dust Challenge Comparison | | | |
|---|---|---|---|---|
| | Weight Effic. | Pen. | Pressure Drop (mm H$_2$O) | |
| Sample | (%) | (%) | Initial | Final |
| P1 | 95.2 | 4.8 | 42.2 | 138.0 |
| P3 | 92.1 | 7.9 | 53.8 | 403.6 |
| NW40[1] | 99.5 | 0.5 | 21.7 | 40.3 |
| NW30[2] | 98.2 | 1.8 | 18.6 | 43.1 |
| NW25[3] | 96.6 | 3.4 | 14.8 | 38.7 |
| NW20[4] | 93.4 | 6.6 | 11.8 | 36.7 |

[1]Basis weight of BMF mat 40 gm./m$^2$.
[2]Basis weight of BMF mat 30 gm./m$^2$.
[3]Basis weight of BMF mat 25 gm./m$^2$.
[4]Basis weight of BMF mat 20 gm./m$^2$.

The initial pressure drop and penetration performance of the microfibrous filter laminate 10 of the present invention are comparable to or lower than that of the paper filter media but the final pressure drop demonstrated by the filter laminate 10 of the present invention is significantly lower than that demonstrated by the paper media. The lower final pressure drop is very important in that vacuum filter bags made from this filter laminate 10 will permit a higher air velocity through the vacuum cleaner than will bags made from paper filter media as the bags load.

EXAMPLE 3

Microfibrous filter laminate 10 of the present invention were fabricated into disposable vacuum cleaner filter bags using standard paper media bags as a pattern and hot melt adhesive to join the component parts together. The thus assembled bags were subjected to a simulated in-service test involving a commercially available residential vacuum cleaner as the test apparatus. The vacuum cleaner, fitted with the test filter bag, was placed in a controlled environment chamber so that particle count determinations on particles penetrating the filter bag could be made. An ASTM standard vacuum cleaner test soil consisting of a 9:1 mixture of silica graded sand and laboratory talc was injected into the hose attachment of the vacuum, which passed through an aperture in the chamber wall, by means of an ASHRAE standard dust feeder as described in ASHRAE standard 52–76. Initial air volume was about 2830 liters per minute which corresponded to an initial test velocity of about 50 meters per second. The high air volume and velocity combined to stress the filter media and the seam construction of the bag, allowing the injected dirt to "sand blast" or mechanically erode the filter media immediately opposite the filter bag inlet port and to maximize conditions which allow dust penetration through the filter bag. The test procedure involved allowing the vacuum to develop a steady state of particle counts, taking five readings of particle background counts at one minute intervals, introducing 250 grams of test soil into the vacuum over a period of 10 to 12 minutes while monitoring particle and air velocity measurements at one minute intervals, stopping the vacuum and shaking the filter bag to break up the filter cake, and repeating the cycle a second time for a second loading phase.

Figure 2:
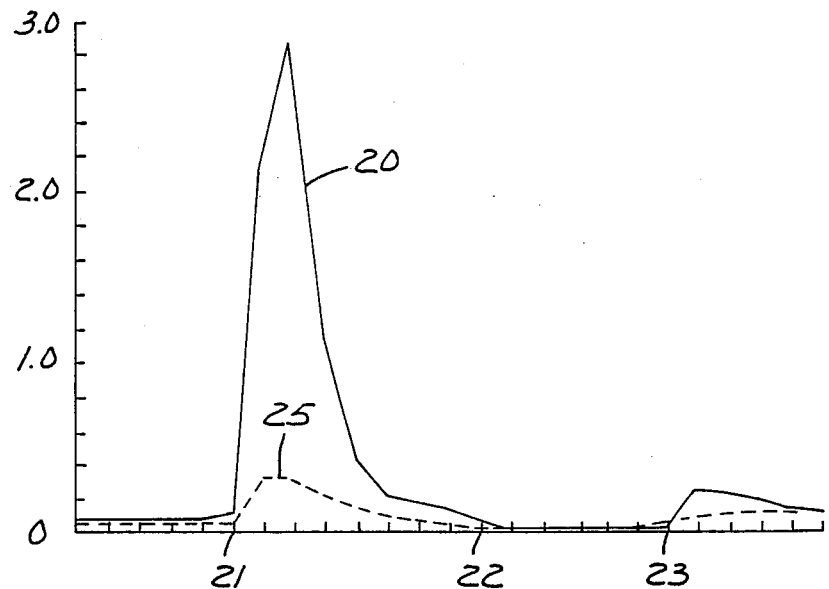
FIG. 2 is a comparison of the concentration of particles penetrating a vacuum cleaner filter bag based on a 40 $gm/m^2$ basis weight filter laminate of the present invention and a commercially available paper filter bag during a soil loading challenge.

Data on particle count versus loading phase from evaluations of a paper media based bag (P3) and a 40 gm./m$^2$ basis weight laminate of the present invention (NW40) are presented in graphic format in FIG. 2 wherein the particle count penetrating the filter bag is plotted on the Y-axis in units of millions of counts per minute and time is plotted along the X-axis.

After a steady state condition had been realized with the test apparatus, the first 250 gm challenge of test soil was introduced into the vacuum cleaner filter bag at time 21. Curve 20, which represents the particle concentration downstream of a conventional commercially available paper filter bag, shows a dramatic change in slope, indicative of a large number of particles passing through the filter bag. As introduction of the test soil into the filter bag continued, the downstream particle count gradually decreased as a result of formation of a filter cake on the filter bag which improved its particle capture efficiency, until at time 22, when the dust challenge was stopped. The vacuum cleaner was stopped and the vacuum bag was vigorously shaken to loosen the filter cake. Then another five background readings were taken. At time 23 a second 250 gm challenge of test soil was introduced into the vacuum cleaner filter bag and curve 20 did show a slight change in slope, indicative of a slightly higher particle penetration level through the filter bag. The lower penetration level with the second test soil challenge was anticipated as a result of small particle loading of the paper filter material during the first soil challenge.

Vacuum cleaner filter bags based on the 40 gm/m$^2$ basis weight microfibrous filter laminate 10 of the present invention showed a significantly different performance in comparison to paper filter bags as is evidenced by curve 25, which represents the particle concentration downstream of the filter bag. Introduction of the initial 250 gm soil challenge to this filter bag at time 21 produced a small change in slope of curve 25, indicating a significantly lower particle penetration level through the filter laminate than occurred with the paper filter bag. The downstream particle count returned to its pre-challenge level more rapidly than it did with the paper filter bags and the filter bag showed a smaller change in slope on addition of the second 250 gm soil challenge than observed with the paper filter bag. These data demonstrate that during the initial loading phase the paper filter media allows a significantly higher level of particles to penetrate (approximately 75 percent higher) through the filter media than the microfibrous filter media of the present invention.

Figure 3:
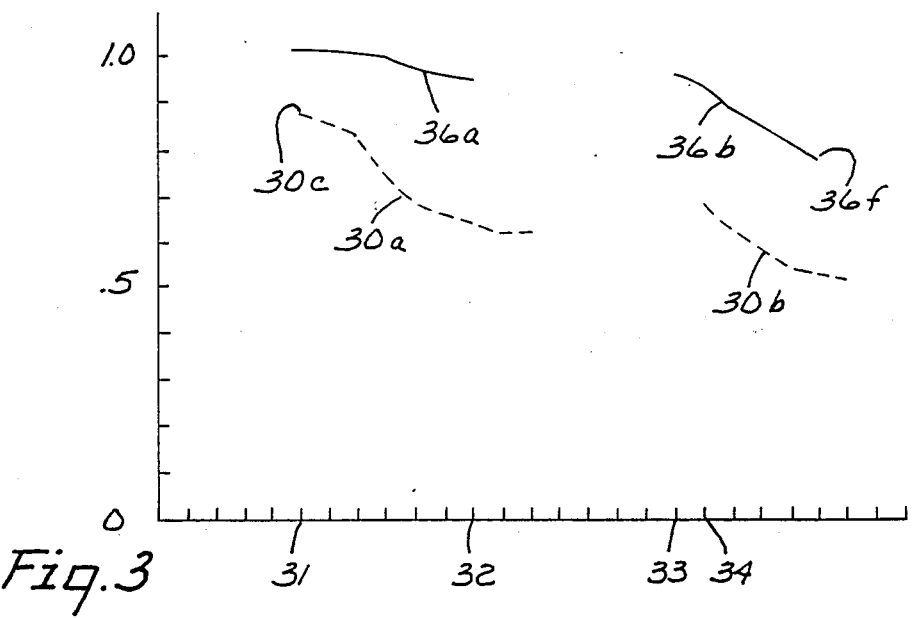
FIG. 3 is a comparison of a vacuum cleaner air velocity with a 40 $gm/m^2$ basis weight filter laminate of the present invention and a commercially available paper filter bag during a soil loading challenge.

In addition to providing a higher particle capture efficiency, the filter laminate 10 of the present invention produce a lower pressure drop in the air passing through the filter, thereby maintaining a higher air velocity through the filter and improving the overall vacuum cleaner performance. FIG. 3 is a graphic presentation of the vacuum cleaner test air velocity, plotted along the Y-axis in units of thousands of feet per minute, as a function of time, which is plotted along the X-axis.

Curve 30a, which represents the vacuum cleaner test air velocity with a conventional commercially available paper filter bag during the initial 250 gm soil challenge which was introduced into the filter bag beginning at time 31, shows a significant drop in air velocity as the filter cake forms on the filter bag. Curve 36a, which represents the vacuum cleaner test air velocity with a vacuum filter bag based on the 40 gm/m² basis weight microfibrous filter laminate 10 of the present invention, shows a higher initial air velocity through the bag and a significantly smaller reduction in velocity at the completion of loading the 250 gm soil challenge (time 32) than the paper filter bag. Both the paper filter bag and the filter bag based on the 40 gm/m² filter laminate 10 of the present invention showed a slight increase in air velocity after being shaken prior to the second 250 gm soil challenge. Curves 30b, corresponding to the paper filter bag, and 36b, corresponding to the 40 gm/m² microfibrous filter laminate 10 of the present invention, showed similar decreases in air velocity through the respective bags during the second 250 gm soil challenges which commenced at times 34 and 33 respectively. It is important to note however, that the microfibrous filter laminate 10 of the present invention had a significantly higher initial (i.e., pre soil challenge) air velocity through the filter bag and that even after loading the filter bag with the second soil challenge, the air velocity 36f through the filter bag based on the microfibrous filter laminate 10 was surprisingly close to the initial air velocity 30c, through the paper filter bag prior to the first soil challenge.

Examination of the interior surface of the filter bags immediately opposite the intake port subsequent to the second loading phase showed no evidence of mechanical erosion of either the microfibrous filter laminate 10 or the paper filter media.

The data collected in this test demonstrates the overall superior performance of the microfibrous filter laminate 10 of the present invention as compared to paper based filter materials typically used in disposable vacuum cleaner bags under test conditions which provide a reasonable simulation of normal use conditions.

I claim:

1. A disposable microfibrous filter material especially suited for use as a dust and debris collection device for vacuum cleaning apparatus, said microfibrous filter material comprising a laminate structure of a porous layer of self-supporting, thermoplastic, nonwoven fabric having an air permeability of at least 300 m³/min/m² and a layer of a randomly intertangled nonwoven mat of electretcontaining microfibers of synthetic polymer coextensively deposited directly on and adhering to said self-supporting nonwoven fabric, said laminate structure having an air permeability of from about 5 to 50 m³/min/m²

2. The disposable filter laminate of claim 1 wherein said mat of electret-containing microfibers has a basis weight of between about 10 to about 100 gm/m².

3. The disposable filter laminate of claim 1 wherein said mat of electret-containing microfibers has a basis weight of between about 20 to about 40 gm/m².

4. The disposable filter laminate of claim 1 wherein said mat of electret-containing microfibers comprises meltblown polyolefin microfibers.

5. The disposable filter laminate of claim 4 wherein said mat of electret-containing microfibers comprises meltblown polypropylene microfibers.

6. The disposable filter laminate of claim 1 wherein said fibers in said mat of electret-containing microfibers have an effective fiber diameter of less than about 10 microns.

7. The disposable filter laminate of claim 1 wherein said fibers in said mat of electret-containing microfibers have an effective fiber diameter of about 7 microns.

8. The disposable filter laminate of claim 1 wherein said layer of self-supporting nonwoven fabric has a grab tensile strength of at least 1 kg.

9. The disposable filter laminate of claim 1 wherein said layer of self-supporting nonwoven fabric has a grab tensile strength of at least 2.5 kg.

10. The disposable filter laminate of claim 8 wherein said self-supporting nonwoven fabric comprises a spunbond fabric.

11. The disposable filter laminate of claim 10 wherein said spunbond fabric comprises polyolefin fibers.

12. The disposable filter laminate of claim 11 wherein said polyolefin fibers comprise polypropylene.

13. The disposable filter laminate of claim 12 wherein said spunbond fabric has a basis weight of between about 10 to about 70 gm/m².

14. The disposable filter laminate of claim 12 wherein said spunbond fabric has a basis weight of between about 15 to about 25 gm/m².

15. The disposable filter laminate of claim 1 wherein said filter laminate has a permeability of at least 20 m³/min/m².

16. The disposable filter laminate of claim 15 wherein said laminate has a thickness of from about 0.3 to about 0.6 mm.

* * * * *

UNITED STATES PATENT AND TRADEMARK OFFICE
CERTIFICATE OF CORRECTION

PATENT NO. : 4,917,942

DATED : April 17, 1990

INVENTOR(S) : John C. Winters

It is certified that error appears in the above-identified patent and that said Letters Patent is hereby corrected as shown below:

Abstract, line 3, correct "provided" to --provides--.

Column 2, line 26, correct "air-previous" to --air-pervious--.

Col. 3, line 46, correct "electric-containing" to --electret-containing--.

Col. 9, line 14, before "velocity" add --air--.

Claim 1, Column 10, line 4, after "adhering" add - directly--.

Signed and Sealed this

Ninth Day of July, 1991

Attest:

HARRY F. MANBECK, JR.

*Attesting Officer*  Commissioner of Patents and Trademarks